(12) United States Patent
Sato (10) Patent No.: US 8,675,234 B2
(45) Date of Patent: Mar. 18, 2014

(54) PRINTING SYSTEM, PRINT SERVICE APPARATUS, SERVICE PROVIDING APPARATUS, CONTROL METHOD AND COMPUTER-READABLE MEDIUM

(75) Inventor: Yuichiro Sato, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 292 days.

(21) Appl. No.: 13/300,159

(22) Filed: Nov. 18, 2011

(65) Prior Publication Data

US 2012/0154854 A1 Jun. 21, 2012

(30) Foreign Application Priority Data

Dec. 20, 2010 (JP) ................................. 2010-283731

(51) Int. Cl.
*G06F 3/12* (2006.01)
*G06K 15/00* (2006.01)
*H04N 1/00* (2006.01)
*G06Q 99/00* (2006.01)
*G06F 15/16* (2006.01)

(52) U.S. Cl.
USPC ......... 358/1.15; 358/1.16; 358/403; 705/319; 709/229

(58) Field of Classification Search
None
See application file for complete search history.

(56) References Cited

U.S. PATENT DOCUMENTS

| 2007/0162608 | A1* | 7/2007 | Selenius et al. | 709/229 |
| 2010/0017705 | A1 | 1/2010 | Sato | |
| 2011/0001995 | A1 | 1/2011 | Sato | |
| 2011/0090529 | A1* | 4/2011 | Hertling | 358/1.15 |
| 2012/0159635 | A1* | 6/2012 | He et al. | 726/26 |

FOREIGN PATENT DOCUMENTS

JP 2000-10922 A 1/2000

OTHER PUBLICATIONS

Ragnet, Francois: "Social Networking for Printers?"; from The Future of Documents by Xerox, Nov. 8, 2007.*

* cited by examiner

*Primary Examiner* — Thomas Lett
(74) *Attorney, Agent, or Firm* — Fitzpatrick, Cella, Harper & Scinto (57) ABSTRACT

A print service apparatus includes: a reception unit configured to receive, via a Web browser together with a print job designated from a window, window information of the window, user information, and message information of a message which is contained in the window and provided by a microblogging function; an addition unit configured to add, as a user using the microblogging function, a comment on the message corresponding to the message information to the window; a monitoring unit configured to monitor whether another user has added a comment on the message corresponding to the message information; a determination unit configured to determine whether the added comment is a comment by the user; and a decision unit configured to decide processing for the print job based on a content of the added comment when the determination unit determines that the added comment is a comment by the user.

16 Claims, 8 Drawing Sheets

| 801 |
|---|
| JOB INFORMATION TABLE |
| PRINT JOB ID ~802 |
| PRINT JOB ENTITY ~803 |
| ... |

FIG. 7C

| 901 |
|---|
| MESSAGE INFORMATION TABLE |
| WORK WINDOW ACCOUNT NAME ~902 |
| MESSAGE ID ~903 |
| PRINTING EXECUTION ACCOUNT NAME ~904 |
| PRINT JOB ID ~905 |
| ... |

PRINTING SYSTEM, PRINT SERVICE APPARATUS, SERVICE PROVIDING APPARATUS, CONTROL METHOD AND COMPUTER-READABLE MEDIUM

BACKGROUND OF THE INVENTION

1. Field of the Invention

The present invention relates to a technique regarding an instruction to process a document saved on a network provided by a cloud service. More particularly, the present invention relates to a printing system which prints a document on the network, a control method thereof, and a computer-readable medium.

2. Description of the Related Art

Recently, a cloud computing system (to be referred to as a cloud service) is becoming popular as a form in which management of work data and various processes are performed on the server computer side. A user can print, via a print service, a document (document data) saved on a network provided by the cloud service. A user accesses a Web page provided by the cloud service from the Web browser of a client terminal via the Internet or the like and displays, on the Web page, a work window containing details of the document he wants to print. When the user issues a job save instruction via the window, the cloud service transmits a print job to the print service to save the job or perform print processing. When the document is saved in the print service, the user further accesses the Web page of the print service from the Web browser of the client terminal, the control panel of a printing apparatus, or the like. The user needs to select, on the Web page, a document he wants to print, and input a print instruction.

Some platforms regarding the cloud service include a microblogging function. The microblogging function is one communication service. A user having an account for this service can post a short message called "tweet", and a unique identifier is assigned to every posting. A user here includes objects, applications, and the like on the cloud service such as the above-mentioned work window, a printer, and a cooperative service, and is not limited to a real user (human). A user-specific Web page called a "timeline" displays a posting by himself and a posting by a "following" user, enabling communication via following. "Following" means a user registers another user so that a message posted by the registered user can be displayed on the Web page of the user. The cloud service is, for example, Salesforce.com®, and its microblogging function is Salesforce Chatter®.

A technique of executing processing by a server based on an instruction from a client is as follows. The client terminal transmits a file describing an execution command to an FTP folder. Upon detecting that the client terminal has transmitted the file, the server executes an instruction described in the file, and can execute a job (see, for example, Japanese Patent Laid-Open No. 2000-10922).

A user who has logged in to a platform providing the cloud service needs to save a job in the print service via a work window and then transmit, to the print service, a file describing an execution command which designates a job and user name. Thus, the platform providing the cloud service requires a function of managing, by itself, information of a job saved in the print service. When the user logs in to the print service and selects a job from a list of saved jobs, he needs to log in to respective services till the completion of printing, and work for a series of processes is cumbersome.

SUMMARY OF THE INVENTION

According to one aspect of the present invention, there is provided a printing system comprising a client terminal having a Web browser, a Web service apparatus having a microblogging function, a print service apparatus, and an image forming apparatus, which are connected via a network, the print service apparatus including: a reception unit configured to receive, via the Web browser together with a print job designated from a window provided by the Web service apparatus, window information of the window, user information of a user who has designated the print job, and message information of a message which is contained in the window and provided by the microblogging function; a management unit configured to manage the window information, the user information, the message information, and the print job in association with each other; an addition unit configured to add, as a user using the microblogging function, a comment on the message corresponding to the message information to the window; a monitoring unit configured to monitor whether another user has added a comment on the message corresponding to the message information to the window; a determination unit configured to determine whether the added comment is a comment by the user corresponding to the user information; and a decision unit configured to decide processing for the print job based on a content of the added comment when the determination unit determines that the added comment is a comment by the user corresponding to the user information.

According to another aspect of the present invention, there is provided a printing system comprising a client terminal having a Web browser, a Web service apparatus having a microblogging function, a print service apparatus, and an image forming apparatus, which are connected via a network, the print service apparatus including: a reception unit configured to receive, via the Web browser together with a print job designated from a window provided by the Web service apparatus, user information of a user who has designated the print job; a management unit configured to manage the user information and the print job in association with each other; an addition unit configured to add a message as a user using the microblogging function to the window; a monitoring unit configured to monitor whether another user has added a comment on the message to the window; a determination unit configured to determine whether the added comment is a comment by the user corresponding to the user information; and a decision unit configured to decide processing for the print job based on a content of the added comment when the determination unit determines that the added comment is a comment by the user corresponding to the user information.

According to another aspect of the present invention, there is provided a print service apparatus in a printing system including a client terminal having a Web browser, a Web service apparatus having a microblogging function, a print service apparatus, and an image forming apparatus, which are connected via a network, comprising: a reception unit configured to receive, via the Web browser together with a print job designated from a window provided by the Web service apparatus, window information of the window, user information of a user who has designated the print job, and message information of a message which is contained in the window and provided by the microblogging function; a management unit configured to manage the window information, the user information, the message information, and the print job in association with each other; an addition unit configured to add, as a user using the microblogging function, a comment on the message corresponding to the message information to the window; a monitoring unit configured to monitor whether another user has added a comment on the message corresponding to the message information to the window; a determination unit configured to determine whether the added comment is a comment by the user corresponding to the user information; and a decision unit configured to decide processing for the print job based on a content of the added comment when the determination unit determines that the added comment is a comment by the user corresponding to the user information.

According to another aspect of the present invention, there is provided a print service apparatus in a printing system including a client terminal having a Web browser, a Web service apparatus having a microblogging function, a print service apparatus, and an image forming apparatus, which are connected via a network, comprising: a reception unit configured to receive, via the Web browser together with a print job designated from a window provided by the Web service apparatus, user information of a user who has designated the print job; a management unit configured to manage the user information and the print job in association with each other; an addition unit configured to add a message as a user using the microblogging function to the window; a monitoring unit configured to monitor whether another user has added a comment on the message to the window; a determination unit configured to determine whether the added comment is a comment by the user corresponding to the user information; and a decision unit configured to decide processing for the print job based on a content of the added comment when the determination unit determines that the added comment is a comment by the user corresponding to the user information.

According to another aspect of the present invention, there is provided a print service apparatus in a printing system including a client terminal having a Web browser, a Web service apparatus having a microblogging function, a print service apparatus, and an image forming apparatus, which are connected via a network, comprising: a reception unit configured to receive, via the Web browser together with a print job designated from a window provided by the Web service apparatus, user information of a user who has designated the print job; a monitoring unit configured to monitors whether a message to the print job has been added to the window; a determination unit configured to determines whether the added message is a message by the user corresponding to the user information; and a decision unit configured to decides processing for the print job based on a content of the added message when the determination unit determines that the added message is a message by the user corresponding to the user information.

According to another aspect of the present invention, there is provided a service providing apparatus in a system including a client terminal having a Web browser, a Web service apparatus having a microblogging function, and a service providing apparatus, which are connected via a network, comprising: a reception unit configured to receive, via the Web browser together with a job designated from a window provided by the Web service apparatus, window information of the window, user information of a user who has designated the job, and message information of a message which is contained in the window and provided by the microblogging function; a management unit configured to manage the window information, the user information, the message information, and the job in association with each other; an addition unit configured to add, as a user using the microblogging function, a comment on the message corresponding to the message information to the window; a monitoring unit configured to monitor whether another user has added a comment on the message corresponding to the message information to the window; a determination unit configured to determine whether the added comment is a comment by the user corresponding to the user information; and a decision unit configured to decide processing for the job based on a content of the added comment when the determination unit determines that the added comment is a comment by the user corresponding to the user information.

According to another aspect of the present invention, there is provided a service providing apparatus in a system including a client terminal having a Web browser, a Web service apparatus having a microblogging function, and a service providing apparatus, which are connected via a network, comprising: a reception unit configured to receive, via the Web browser together with a print job designated from a window provided by the Web service apparatus, user information of a user who has designated the job; a management unit configured to manage the user information and the job in association with each other; an addition unit configured to add a message as a user using the microblogging function to the window; a monitoring unit configured to monitor whether another user has added a comment on the message to the window; a determination unit configured to determine whether the added comment is a comment by the user corresponding to the user information; and a decision unit configured to decide processing for the job based on a content of the added comment when the determination unit determines that the added comment is a comment by the user corresponding to the user information.

According to another aspect of the present invention, there is provided a method of controlling a print service apparatus in a printing system including a client terminal having a Web browser, a Web service apparatus having a microblogging function, a print service apparatus, and an image forming apparatus, which are connected via a network, comprising: a reception step of receiving, via the Web browser together with a print job designated from a window provided by the Web service apparatus, window information of the window, user information of a user who has designated the print job, and message information of a message which is contained in the window and provided by the microblogging function; a management step of managing the window information, the user information, the message information, and the print job in association with each other; an addition step of adding, as a user using the microblogging function, a comment on the message corresponding to the message information to the window; a monitoring step of monitoring whether another user has added a comment on the message corresponding to the message information to the window; a determination step of determining whether the added comment is a comment by the user corresponding to the user information; and a decision step of deciding processing for the print job based on a content of the added comment when the added comment is determined in the determination step to be a comment by the user corresponding to the user information.

According to another aspect of the present invention, there is provided a method of controlling a print service apparatus in a printing system including a client terminal having a Web browser, a Web service apparatus having a microblogging function, a print service apparatus, and an image forming apparatus, which are connected via a network, comprising: a reception step of receiving, via the Web browser together with a print job designated from a window provided by the Web service apparatus, user information of a user who has designated the print job; a management step of managing the user information and the print job in association with each other; an addition step of adding a message as a user using the microblogging function to the window; a monitoring step of monitoring whether another user has added a comment on the message to the window; a determination step of determining whether the added comment is a comment by the user corresponding to the user information; and a decision step of deciding processing for the print job based on a content of the added comment when the added comment is determined in the determination step to be a comment by the user corresponding to the user information.

According to another aspect of the present invention, there is provided a non-transitory computer-readable medium storing a program for causing a computer to function as reception unit configured to receive, via a Web browser together with a print job designated from a window provided by a Web service apparatus, window information of the window, user information of a user who has designated the print job, and message information of a message which is contained in the window and provided by a microblogging function, management unit configured to manage the window information, the user information, the message information, and the print job in association with each other, addition unit configured to add, as a user using the microblogging function, a comment on the message corresponding to the message information to the window, monitoring unit configured to monitor whether a comment corresponding to the message information has been added to the window, determination unit configured to determine whether the added comment is a comment by the user corresponding to the user information, and decision unit configured to decide processing for the print job based on a content of the added comment when the determination unit determines that the added comment is a comment by the user corresponding to the user information.

According to another aspect of the present invention, there is provided a non-transitory computer-readable medium storing a program for causing a computer to function as reception unit configured to receive, via a Web browser together with a print job designated from a window provided by a Web service apparatus, user information of a user who has designated the print job, management unit configured to manage the user information and the print job in association with each other, addition unit configured to add a message as a user using the microblogging function to the window, monitoring unit configured to monitor whether another user has added a comment on the message to the window, determination unit configured to determine whether the added comment is a comment by the user corresponding to the user information, and decision unit configured to decide processing for the print job based on a content of the added comment when the determination unit determines that the added comment is a comment by the user corresponding to the user information.

According to the present invention, when the print service receives a print job in accordance with a user operation from the work window of a platform which provides a cloud service, it follows a user corresponding to the work window till the completion of the print job. Printing is executed when it is detected that a printing start message from the user who designates execution of printing has been written in the work window. The user can execute the print job saved in the print service without logging in to the print service.

By writing a printing start message on the work window from which the user has designated save of a print job, the user can designate a print job he wants, without paying attention to either the print job saved in the print service or the work window from which he has saved the print job.

Further features of the present invention will become apparent from the following description of exemplary embodiments (with reference to the attached drawings).

DESCRIPTION OF THE EMBODIMENTS

<First Embodiment>
[System Configuration]

Figure 1:
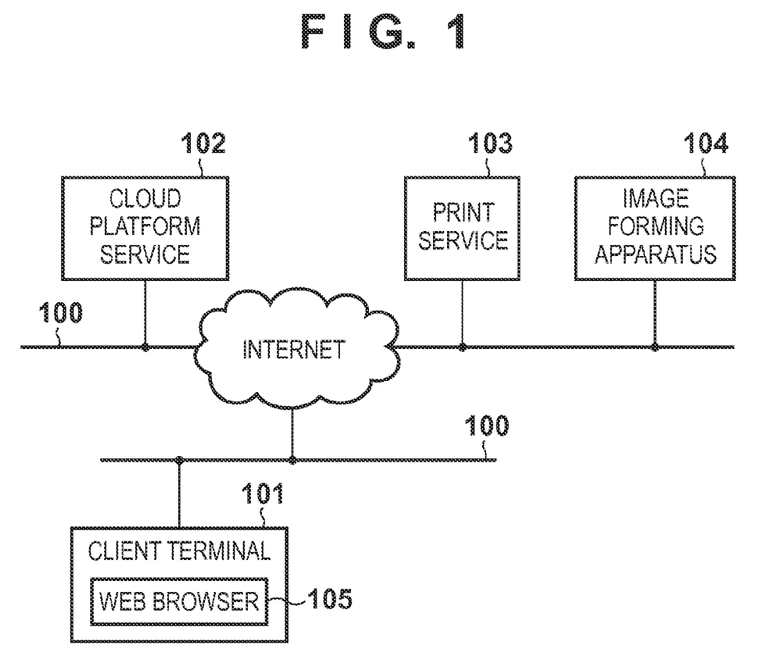
FIG. 1 is a block diagram showing a system configuration.

An embodiment of the present invention will now be described with reference to the accompanying drawings. FIG. 1 is a block diagram showing a system configuration according to the first embodiment of the present invention. Referring to FIG. 1, a client terminal 101 issues requests to a cloud platform service 102 which provides a cloud service, and a print service 103. In this specification, a "service" means an apparatus or unit for providing a predetermined function. Hence, the cloud platform service and print service will also be described as a Web service apparatus and print service apparatus.

The cloud platform service 102 performs display, updating, and the like of held data in response to requests from the client terminal 101 and print service 103. The cloud platform service 102 includes a microblogging function, and writes and reads messages from the client terminal 101 and print service 103. Further, the cloud platform service 102 can perform display and updating of a held message and a following operation in response to following start and following release requests from the user.

The print service 103 receives and saves a print job in response to requests from the cloud platform service 102. An image forming apparatus 104 prints a received print job in accordance with a print instruction from the print service 103.

These components are communicably connected via a network 100. The network is one of a WAN such as the Internet, LAN, telephone line, dedicated digital line, ATM, frame relay circuit, cable television line, data broadcasting wireless line, and the like, or is a so-called communication network implemented by a combination of them. The network 100 suffices to transmit/receive data. A communication unit from the client terminal 101 to the cloud platform service 102 and print service 103, and a communication unit from the print service 103 to the image forming apparatus 104, and a communication unit between each service and the image forming apparatus may be different from each other.

The microblogging function provided by the cloud platform service used in the embodiment can follow a client (user) to acquire a message, and can also follow a provided work window. In this case, the microblogging function can acquire information of a message posted on the work window.

In this specification, a following or followed "user" means not only a real human but also objects capable of posting a message, such as an apparatus and application.

[Hardware Configuration]

Figure 2:
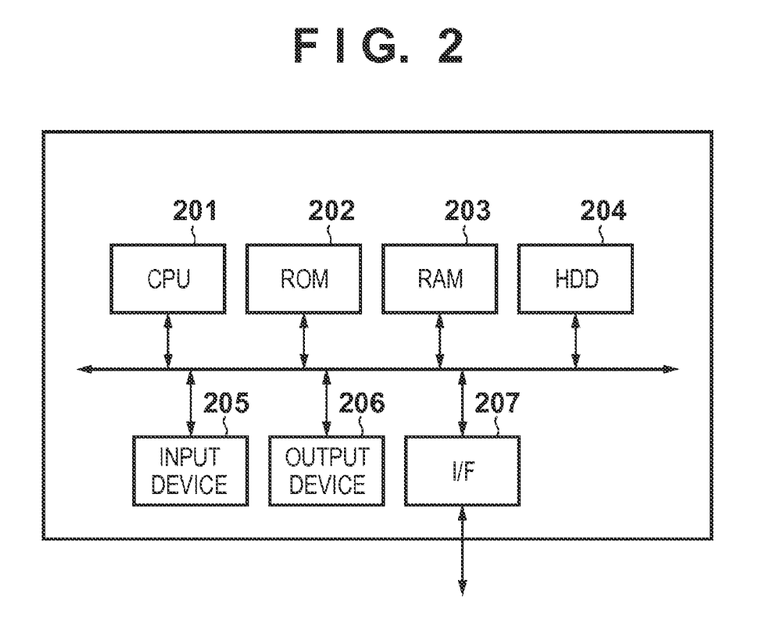
FIG. 2 is a block diagram showing the hardware configuration of each apparatus.

FIG. 2 is a block diagram showing the hardware configuration of the client terminal 101, cloud platform service 102, and print service 103 in FIG. 1. Referring to FIG. 2, a CPU 201 directly or indirectly controls respective devices (for example, ROM and RAM) connected via an internal bus, and executes a program for implementing the present invention. A ROM 202 stores a BIOS. A RAM (direct storage device) 203 is used as the work area of the CPU 201 or a temporary storage for loading a software module for implementing the present invention. An indirect storage device 204 is, for example, an HDD (Hard Disk Drive) or SSD (Solid State Drive) which stores an OS serving as basic software and software modules. An input device 205 includes a keyboard and pointing device (neither is shown). An output device 206 is a display in this case. An I/F 207 is an interface for connecting to the network 100.

Of these hardware modules, the CPU 201 executes a held BIOS upon start-up, and the OS is loaded from the HDD 204 to the RAM 203 to be able to execute it. In accordance with an OS operation, the CPU 201 loads various software modules (to be described later) from the HDD 204 to the RAM 203 to be able to execute them, as needed. Various software modules are executed by the CPU 201 to run by cooperation between devices. The I/F 207 is connected to the network 100, controlled by the CPU 201 in accordance with an OS operation, and implements communication by the above-described communication unit.

Figure 3:
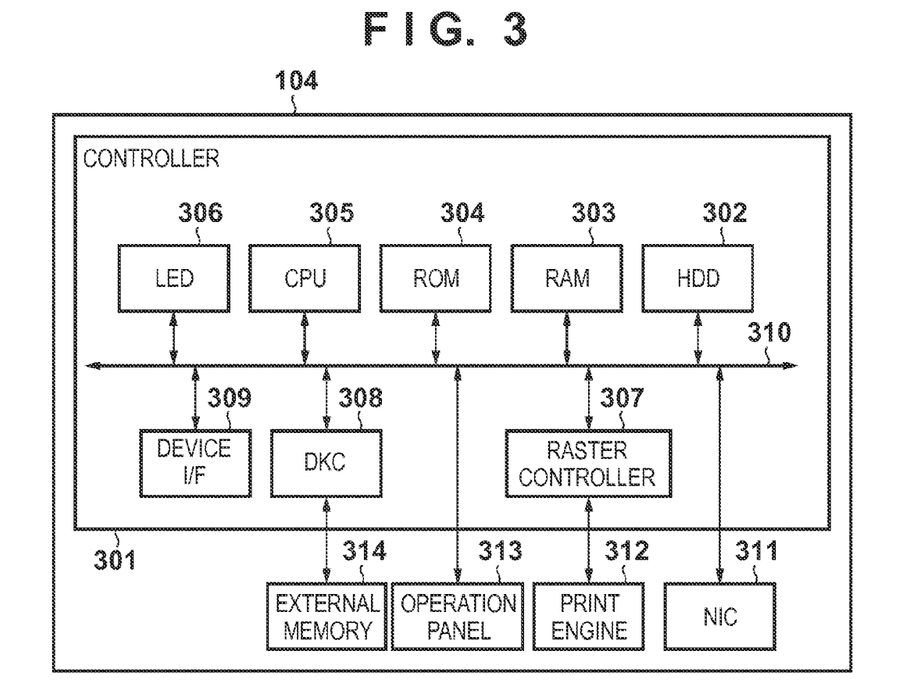
FIG. 3 is a block diagram showing the hardware configuration of an image forming apparatus.

FIG. 3 is a block diagram showing the hardware configuration of the image forming apparatus 104 in the printing system according to the embodiment of the present invention. A controller 301 is a device which manages the control system of the image forming apparatus. A CPU 302 controls the overall apparatus, and comprehensively controls accesses to various devices connected to a system bus 310. Control by the CPU 302 is based on a control program or the like stored in a ROM 304, or a control program, resource data (resource information), or the like stored in an external memory 314 connected via a disk controller (DKC) 308. A RAM 303 functions as a main memory, work area, and the like for the CPU 302. Note that the RAM 303 is configured to be able to expand the memory capacity by an optional RAM connected to an expansion port (not shown).

An external storage unit 305 functions as a large-capacity memory, and stores Web service programs, related programs, and the like. An operation panel (operation unit) 313 includes buttons, and a display such as a liquid crystal panel or LED 306 to set an operation mode and the like, display the operation status of the image forming apparatus 104, and perform an operation such as designation of copying. The image forming apparatus 104 exchanges data with an external apparatus via a network interface card (NIC) 311. A print engine 312 shown in FIG. 3 utilizes a known printing technique, and its execution system complies with an electrophotographic method (laser beam method), inkjet method, sublimation transfer (thermal transfer) method, or the like. A raster controller 307 is a controller which converts print data in the PDL language or PDF language into image data. A device I/F 309 is a connection I/F with an external device connectable by a USB or the like.

[Software Configuration]

Figure 4:
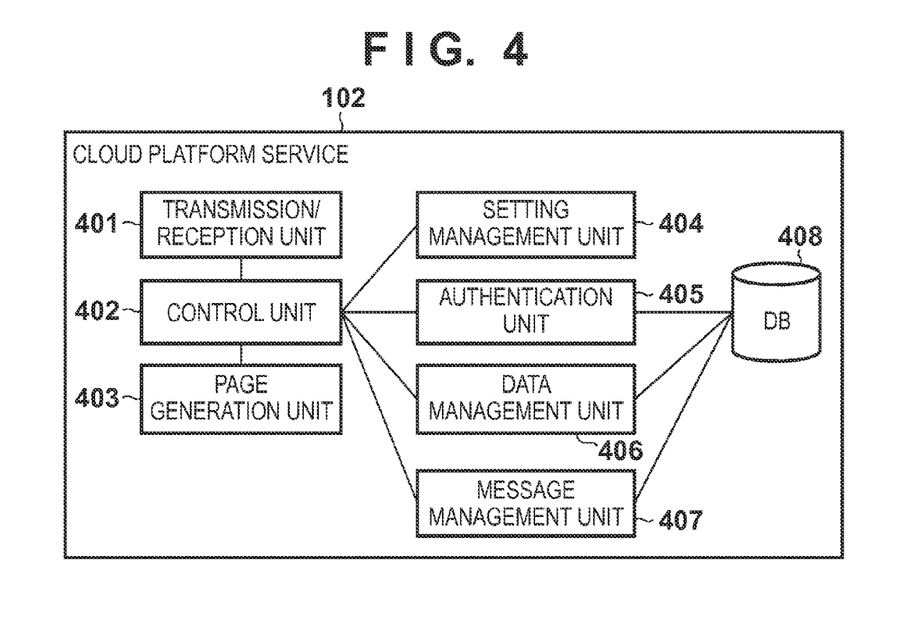
FIG. 4 is a block diagram showing the software module configuration of a cloud platform service.

FIG. 4 is a block diagram showing the configuration of software modules which run on the cloud platform service 102. Note that the software modules are stored in the HDD 204 shown in FIG. 2, loaded into the RAM 203, and executed by the CPU 201. The cloud platform service 102 includes the following components. In this specification "Tweet®" by a user to the microblogging function will be described as "message". Message data indicates character string information.

A transmission/reception unit 401 processes communication with a Web browser 105 of the client terminal 101 and the print service 103, and transmits/receives data. A control unit 402 executes processing in accordance with a request accepted by the transmission/reception unit 401. A page generation unit 403 generates a Web page to send back a response to the Web browser 105. A setting management unit 404 holds a print job to the print service 103, a work window account, and settings for transmitting a message ID. An authentication unit 405 authenticates a user who requests login.

A data management unit 406 holds work data in a DB 408, and acquires work data from the DB 408 or updates it in accordance with a request. Also, the data management unit 406 generates, from acquired work data, a print job to be transmitted to the print service 103. A message management unit 407 holds message data in the DB 408, and acquires message data from the DB 408 or updates it in accordance with a request. The message management unit 407 holds a following user in the DB 408, and if necessary, acquires and updates held data.

The DB 408 stores even settings for transmitting a print job to the print service 103. Work data, messages, and settings for transmitting a print job to the print service 103, which are stored in the DB 408, are set and updated by a user (administrator) via the Web browser 105 at arbitrary timings. Although one DB is arranged in the embodiment, a plurality of DBs may be arranged in accordance with the purpose.

Figure 5:
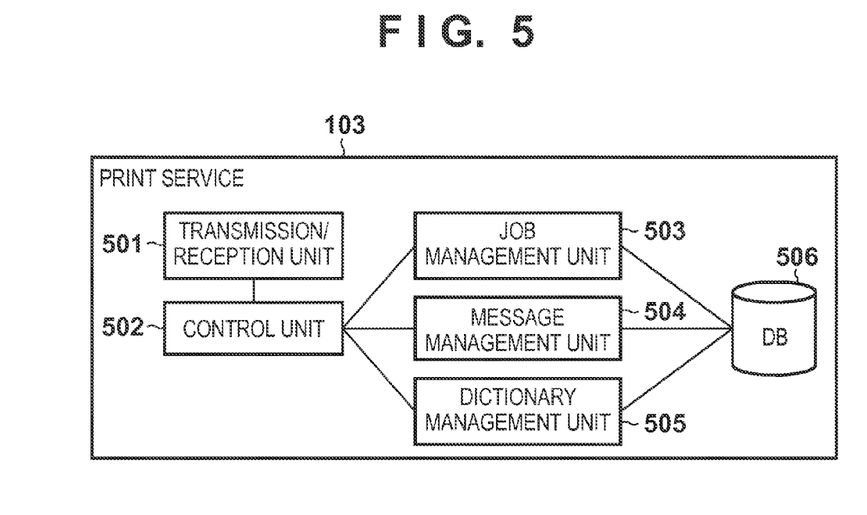
FIG. 5 is a block diagram showing the software module configuration of a print service.

FIG. 5 is a block diagram showing the configuration of software modules in the print service 103. The software modules are stored in the HDD 204 shown in FIG. 2, loaded into the RAM 203, and executed by the CPU 201. The print service 103 includes the following components.

A transmission/reception unit 501 processes communication with the Web browser 105 of the client terminal 101, the cloud platform service 102, and the image forming apparatus 104, and transmits/receives data. A control unit 502 executes processing in accordance with an accepted request. Further, the control unit 502 holds account information (user account name and password) for logging in to the cloud platform service 102, and can write and read a message in and from the microblogging function and perform a following operation. A job management unit 503 holds and manages a print job accepted from the cloud platform service 102 in a DB 506 in association with a print job ID.

A message management unit 504 holds and manages, in the DB 506 in association with a print job ID, a work window account name, printing execution account name, and message ID which are received from the cloud platform service 102. A dictionary management unit 505 performs processing of interpreting the meaning of a message (or comment) acquired by the message management unit 504 from the cloud platform service 102. Although one DB is arranged in the embodiment, a plurality of DBs may be arranged in accordance with the purpose.

[Example of Work Window]

Figure 6:
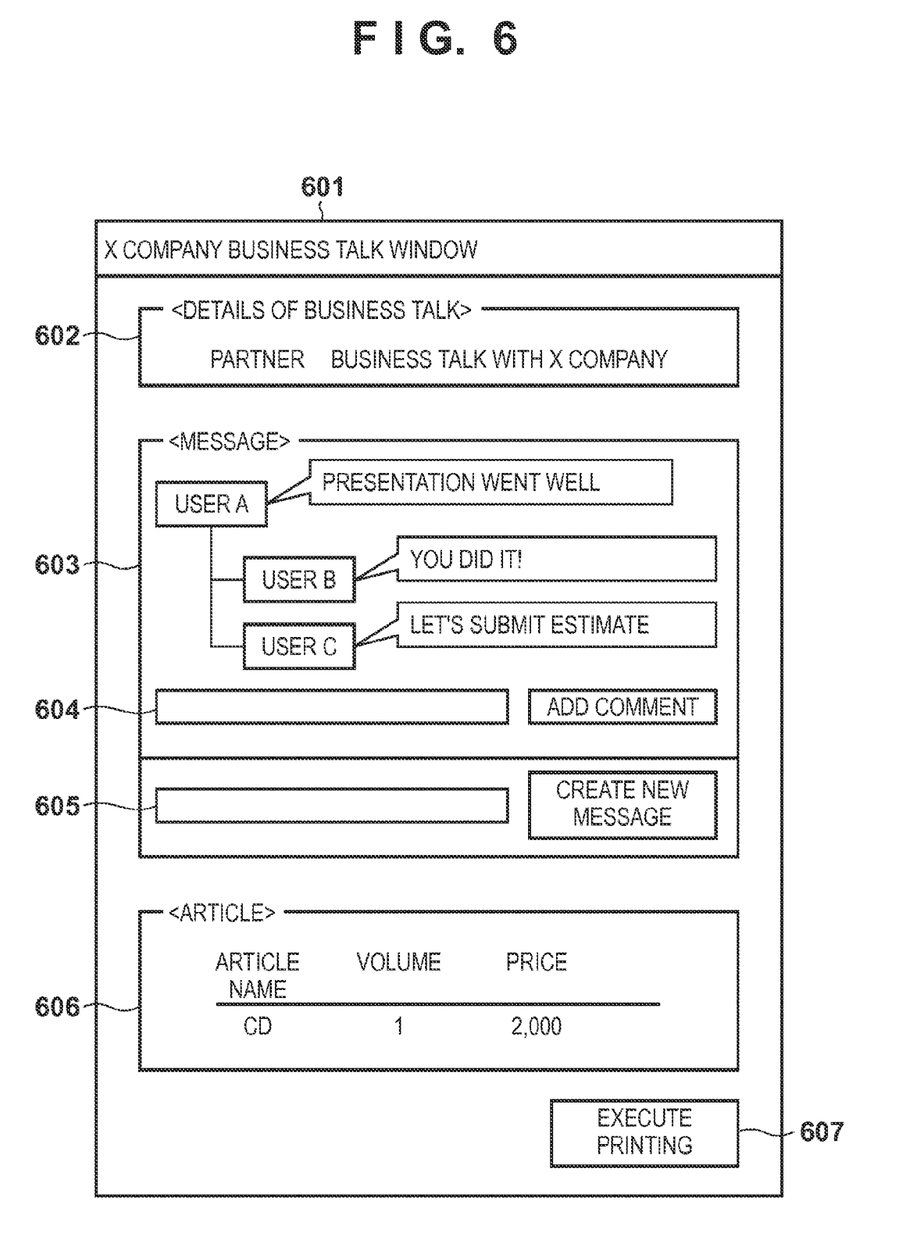
FIG. 6 is a view exemplifying the work window of the cloud platform service.

FIG. 6 exemplifies a work window 601 when the user accesses the cloud platform service 102 from the Web browser 105 of the client terminal 101 and displays work data. Assume that the window shown in FIG. 6 appears after the user logs in to the cloud platform service 102. In FIG. 6, details of a business talk record and messages on a work window concerning "business talk" are displayed. The work window 601 displays detailed information 602 of a given record, an article 606, and a message 603 written on the work window 601. A comment addition area 604 includes a text area and button for adding a comment to a written message. A new message creation area 605 includes a text area and button for adding a new message.

In this specification, "message" and "comment" are handled as different kinds of character string information. More specifically, a character string posted by a user for a predetermined message is described as "comment". That is, the user can add (post) a plurality of comments to one message in association with each other. Also, the user can add a plurality of messages to the window shown in FIG. 6.

The work window 601 also displays a custom button 607 having a setting for transmitting a print job to the print service 103. The custom button 607 allows arbitrarily setting an operation upon pressing a button, a window for displaying the custom button 607, and the like. A user (administrator) arranges the custom button 607 on the window. FIG. 6 shows only one custom button 607 having a print job transmission setting. However, a plurality of buttons set by the user can be arranged.

[Example of Table Structure]

Figure 7A:
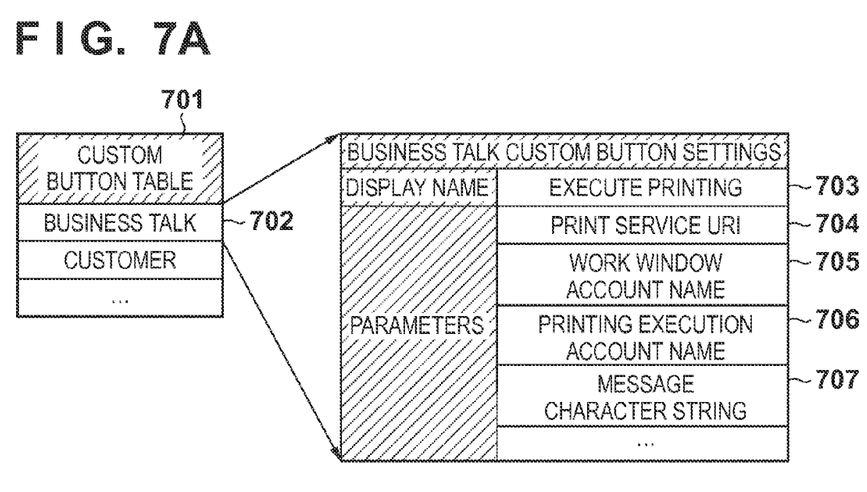
FIGS. 7A, 7B, 7C, and 7D are views exemplifying the structures of respective tables.

FIG. 7A is a view exemplifying custom button definition information held in the setting management unit 404 of the cloud platform service 102. In FIG. 7A, a custom button table 701 defines custom buttons for a "business talk" window and "customer" window, respectively. Setting information 702 of a custom button to be displayed on the "business talk" window stores a button display name 703, and pieces of parameter information for transmitting a print job to the print service 103.

A print service URI 704 is a parameter which designates the URI (Uniform Resource Identifier) of the print service 103 in the form of, for example, "http://...". A work window account name 705 serving as window information is an account name corresponding to a work window having the custom button. In general, when the contents of the work window are changed, the cloud platform service 102 writes a message in the message 603 using a work window account name for uniquely identifying the window. A printing execution account name 706 serving as user information is the account name of a user who pressed the custom button on the work window 601 and executed printing. The printing execution account name 706 stores the account name of a user who logged in to the cloud platform service 102. A user can be uniquely identified by using this information. A message character string 707 stores a message character string to be written in the message 603 upon pressing the custom button 607.

Note that parameters set for the custom button are not limited to the above items, and another item can also be set in correspondence with custom button processing. In FIG. 7A, the custom button table 701 defines only one custom button for the "business talk" window, but a plurality of buttons may be registered. More specifically, settings and the like to be executed as a job are saved.

Figure 7B:
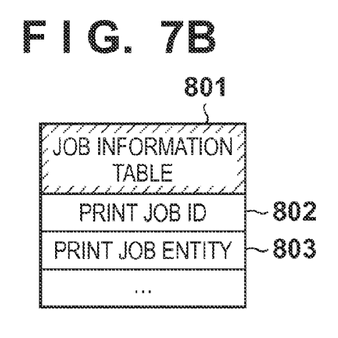

FIG. 7B is a view exemplifying the table structure of a job information table 801 held in the job management unit 503 of the print service 103. A job information record in the job information table 801 has the following components. A print job ID 802 is an ID for uniquely identifying a print job held in the DB 506 of the print service 103. A print job entity 803 is the entity of a print job.

Figure 7C:
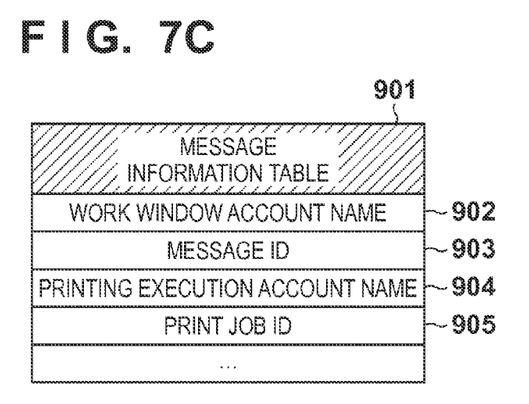

FIG. 7C is a view exemplifying the table structure of a message information table held in the message management unit 504 of the print service 103. A message information record in a message information table 901 has the following components. A work window account name 902 is an account name corresponding to the work window 601 in the cloud platform service 102 serving as a print job transmitting side. The work window account name 902 stores the work window account name 705 included in the custom button 607. A message ID 903 is used to uniquely identify a message written in the work window 601 upon pressing the custom button 607. A printing execution account name 904 is information indicating a user who pressed the custom button 607. The printing execution account name 904 stores the printing execution account name 706 defined for the custom button 607.

Figure 7D:
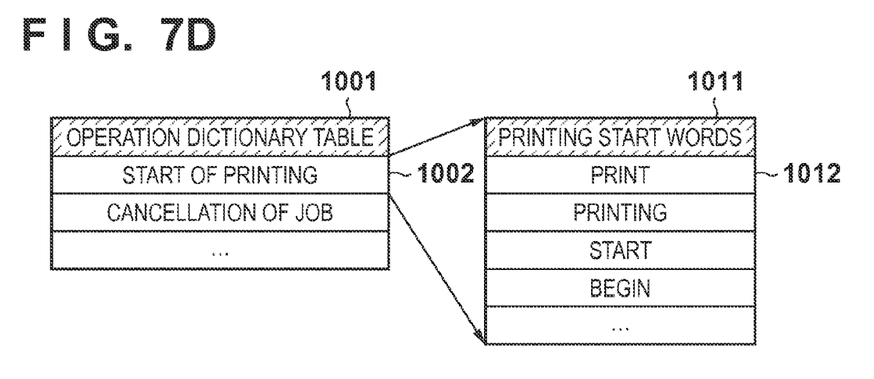

FIG. 7D is a view showing the table structure of an operation dictionary table 1001 held in the dictionary management unit 505 of the print service 103. In FIG. 7D, a "printing start" instruction and "job cancel" instruction are defined in the operation dictionary table 1001. A printing start vocabulary table 1011 stores various words 1012 as a vocabulary associated with the "printing start" instruction. FIG. 7D exemplifies "print", "printing", "start", "begin", and the like as the vocabulary associated with the "printing start" instruction. When a character string registered in the operation dictionary table 1001 is posted as a message (or comment), processing corresponding to the character string is executed. Hence, processing for a job is decided based on a character string registered in the operation dictionary table 1001. As another processing, changing, holding, and the like of print settings may be registered. Assume that the operation dictionary table 1001 is defined in advance. The operation dictionary table 1001 may be configured to allow an administrator or the like to add a character string in accordance with necessary processing.

[Processing Sequence]

Figure 8:
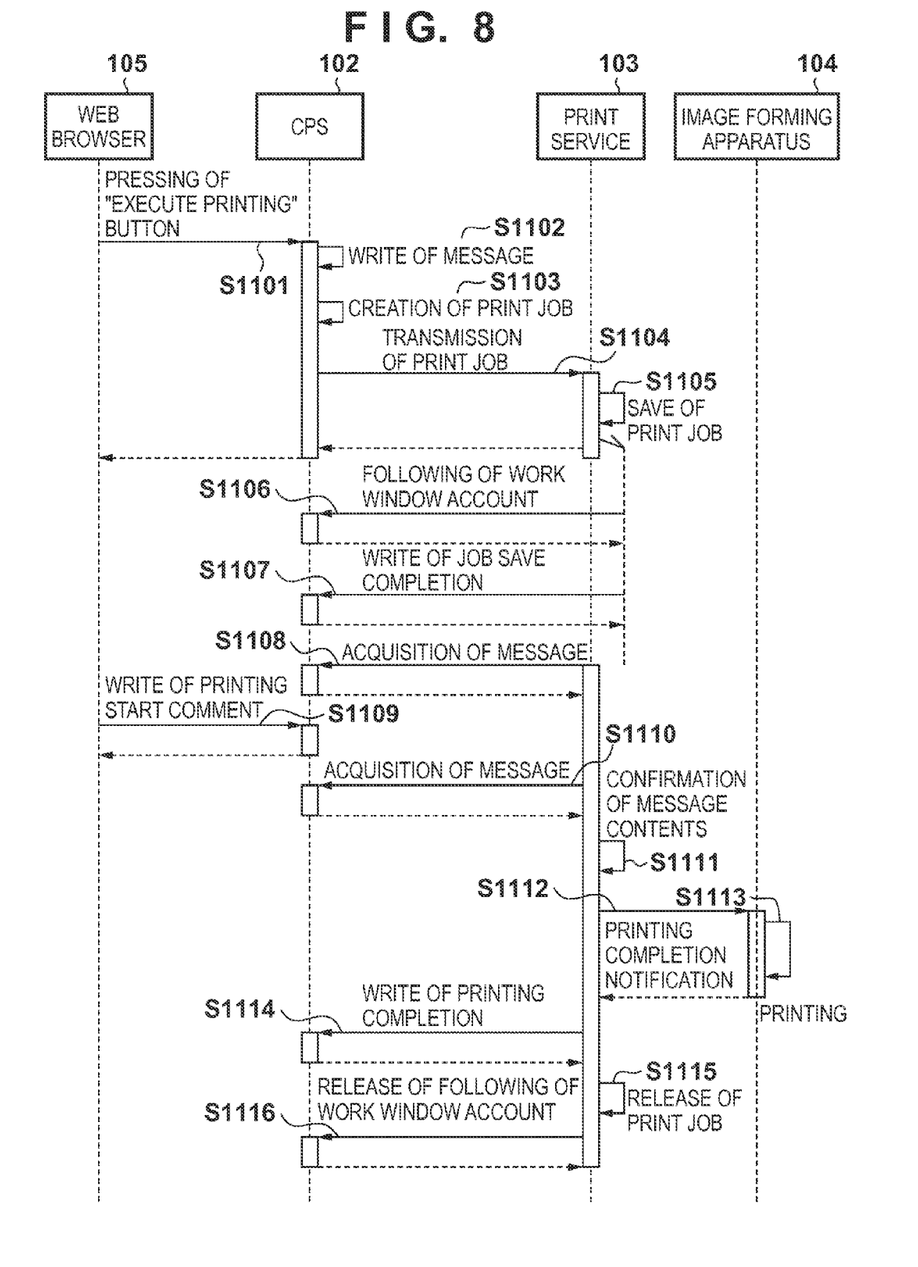
FIG. 8 is a sequence chart showing processing by a printing system according to the first embodiment.
Figure 9A:
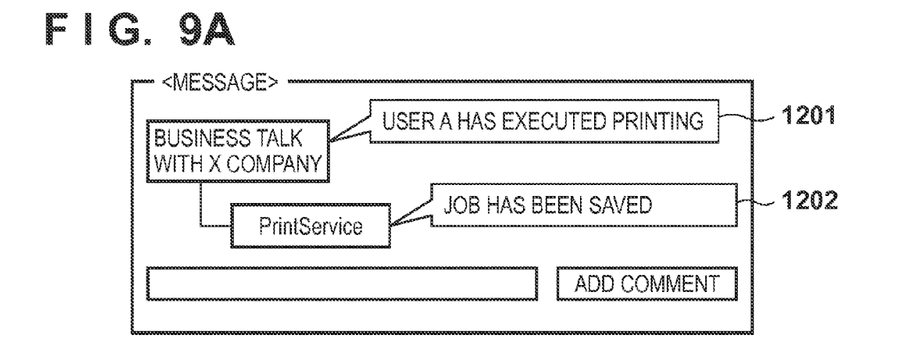
FIGS. 9A, 9B, and 9C are views exemplifying message windows displayed on a Web browser according to the first embodiment.
Figure 9B:
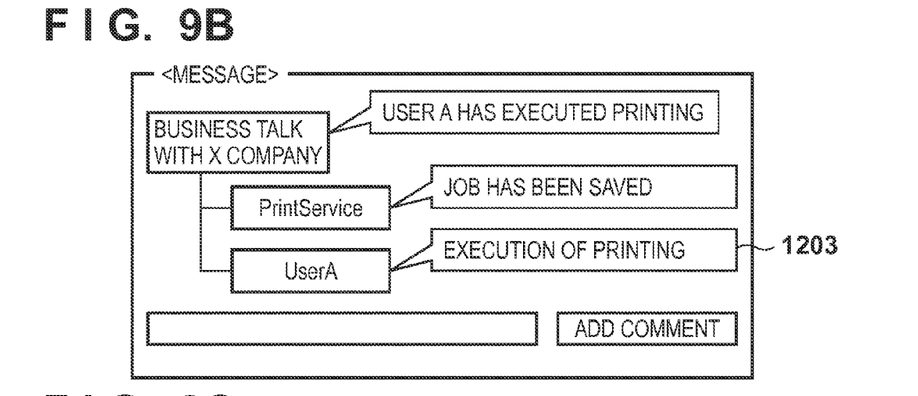
Figure 9C:
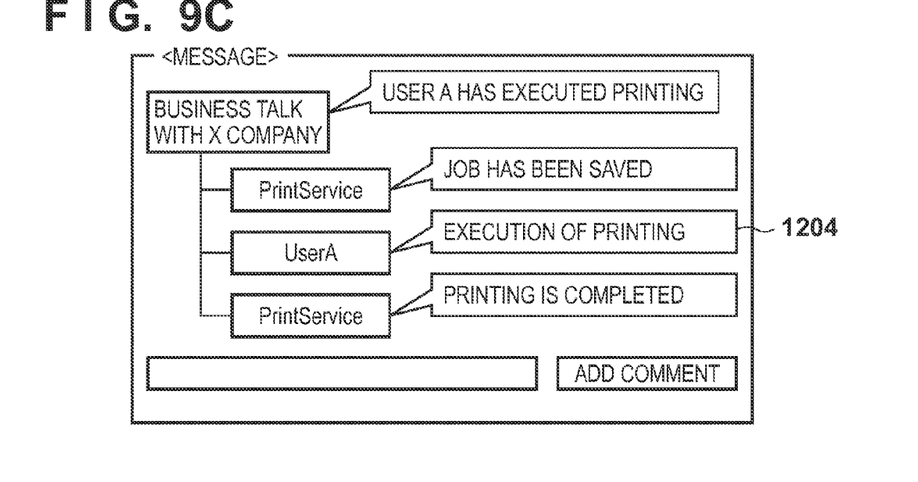

The sequence of processing by the printing system in the embodiment will be explained with reference to FIGS. 8 and 9A to 9C. FIG. 8 is a chart showing a sequence by the printing system according to the embodiment. FIGS. 9A to 9C are views each exemplifying the window of the message 603 on the work window 601 displayed on the Web browser 105 of the client terminal 101 in the printing system of FIG. 1.

In subsequent drawings, the cloud platform service will be abbreviated as "CPS". Assume that the user has logged in to the cloud platform service 102 via a login window (not shown), the Web browser 105 has displayed the work window 601 of FIG. 6, and the settings shown in FIG. 7A have been made in advance for the custom button 607.

First, the user presses the custom button 607 of the work window 601 displayed on the Web browser 105 of the client terminal 101 (step S1101). Then, the cloud platform service 102 executes step S1102. In step S1102, the cloud platform service 102 writes a printing execution start message in the message 603. More specifically, the cloud platform service 102 writes the message character string 707 using the work window account name 705.

In step S1103, the cloud platform service 102 creates a print job. In step S1104, the cloud platform service 102 transmits the print job to the print service URI 704 together with the work window account name 705, the printing execution account name 706, and the message ID 903 for uniquely identifying message character string 707.

In step S1105, the print service 103 receives the print job from the cloud platform service 102. First, the control unit 502 saves the print job in the job management unit 503. Then, the control unit 502 issues the print job ID 802 to uniquely identify the print job, and stores it in the job information table 801. The control unit 502 saves the work window account name 705, the printing execution account name 706, and the message ID 903 in the message management unit 504 together with the print job ID 802 issued by the job management unit 503.

In step S1106, the control unit 502 of the print service 103 acquires the work window account name 705 via the message management unit 504, and follows a work window account with which the user has designated execution of printing. After that, information about updating of the message 603 of the work window 601 in the cloud platform service 102 can be acquired. By acquiring message update information, an instruction to the job by "tweet" of the user can be monitored.

In step S1107, the control unit 502 writes, for the message 603 on the work window 601 in the cloud platform service 102, a comment indicating that save of the job is completed. More specifically, in the embodiment, the control unit 502 acquires the message ID 903 via the message management unit 504, and writes (posts) a comment on the message corresponding to the message ID 903.

FIG. 9A exemplifies the message 603 upon completion of step S1107. A comment 1202 that the print service 103 has saved a job is written for the message ID of a message 1201 (in the example of FIG. 9A, "User A has executed printing.") written by the cloud platform service 102 in step S1102. Then, the control unit 502 of the print service 103 periodically transmits a message acquisition request to the cloud platform service 102 (step S1108).

In step S1109, the user writes, from the Web browser 105 of the client terminal 101, a comment indicating the start of printing in the comment addition area 604 contained in the work window 601 in the cloud platform service 102. In response to this, the Web browser 105 transmits a printing start message write request to the cloud platform service 102 (step S1110). FIG. 9B exemplifies the message 603 when the printing start comment is written in step S1109. In this example, a comment 1203 indicating execution of printing is written.

After the printing start comment is written in step S1109, the print service 103 can acquire the printing start comment by a subsequent periodic message acquisition request (step S1110). If a new comment has been acquired, the control unit 502 confirms the message contents of the comment in step S1111. More specifically, the control unit 502 determines via the message management unit 504 whether the comment has been added to the message indicated by the message ID 903 in the message information table 901.

If the comment has been added in correspondence with the message ID 903, the control unit 502 determines via the message management unit 504 whether the comment has been written with the printing execution account name 904 contained in the record of the message ID 903. If the account with which the comment has been written matches the printing execution account name 904, the control unit 502 compares the contents of the comment with the operation dictionary table 1001 via the dictionary management unit 505, and determines whether the comment is a printing start instruction. More specifically, the control unit 502 determines whether the comment contains one of the words 1012 in the printing start vocabulary table 1011.

If the control unit 502 determines that the comment is a printing start instruction, it acquires the print job ID 802 corresponding to the message ID 903 via the message management unit 407 in step S1112. The control unit 502 transmits the print job entity 803 corresponding to the message ID 903 to the image forming apparatus 104 via the job management unit 503.

In step S1113, the image forming apparatus 104 prints the print job received from the print service 103. The image forming apparatus 104 transmits a printing completion notification as a response to the print service 103. In step S1114, the control unit 502 of the print service 103 writes a printing completion comment for the message 603 in the cloud platform service 102. FIG. 9C exemplifies the message 603 when the printing completion comment is written in step S1114. In this case, a comment 1204 indicating the completion of printing is written.

In step S1115, the control unit 502 of the print service 103 deletes, via the job management unit 503, the print job whose processing is completed. In step S1116, the control unit 502 of the print service 103 transmits, a following release request for the work window account name 902 via the message management unit 504. In addition, the control unit 502 deletes, via the message management unit 504, a record in the message information table 901 that corresponds to the deleted print job.

[Print Service Processing]

Figure 10:
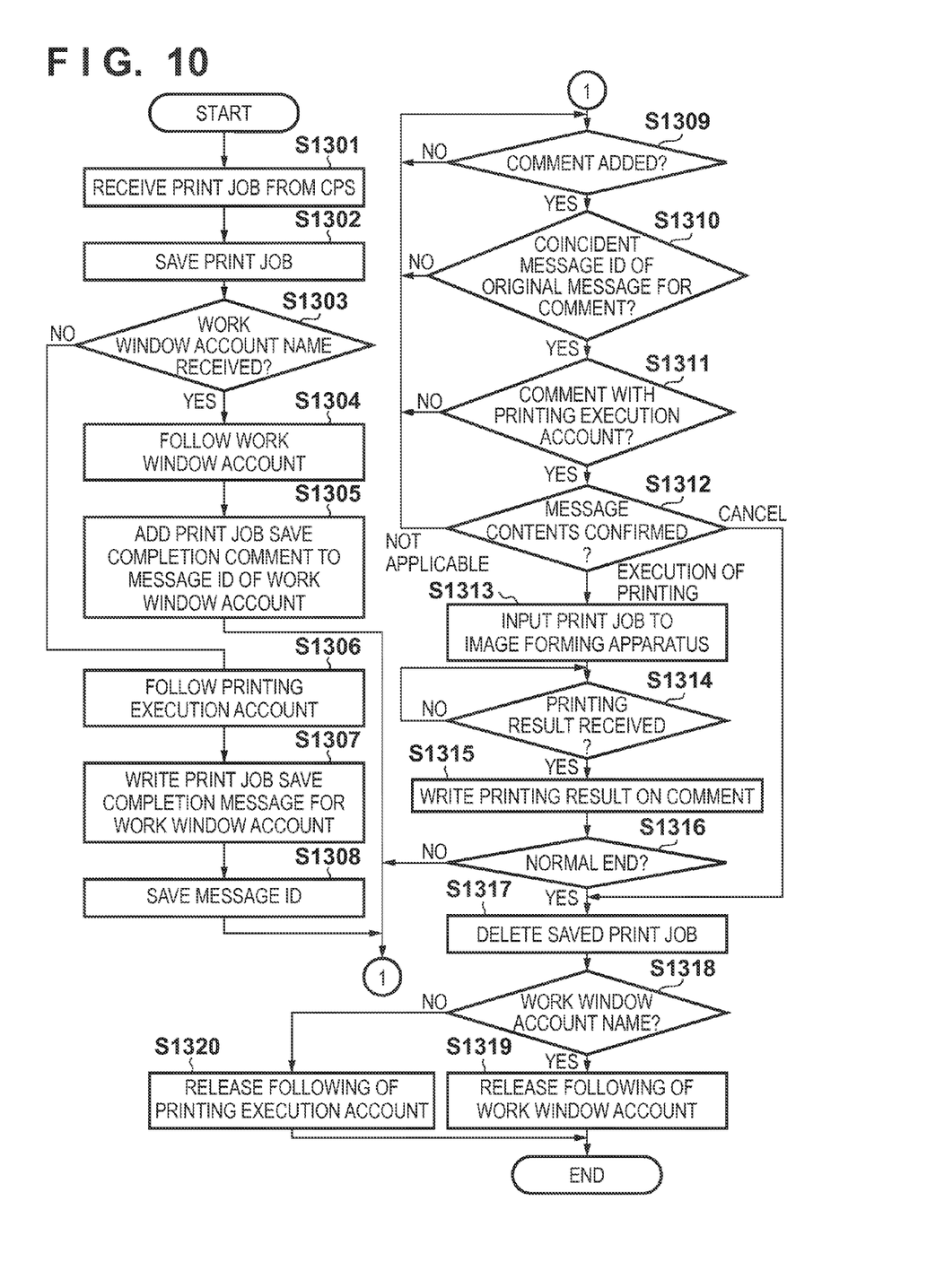
FIG. 10 is a flowchart showing processing by a print service.

FIG. 10 is a flowchart showing processing by the print service 103 in steps S1104 to S1116 of FIG. 8. In this specification, the control unit 502 includes a CPU, RAM, ROM, and HDD. Procedures given by the flowchart are stored in any storage unit out of the RAM, ROM, and HDD of the control unit 502, and executed by the CPU 201.

The control unit 502 receives a print job transmission request from the cloud platform service 102 (step S1301). In step S1302, the control unit 502 generates the print job ID 802 via the job management unit 503, and adds a record to the job information table 801 together with the print job entity 803. In step S1302, the control unit 502 adds, to the message information table 901 via the message management unit 504 together with the print job ID 802, the record of information received from the cloud platform service 102. In the embodiment, the received information includes the work window account name 902, message ID 903, and printing execution account name 904. In the second embodiment, the received information is different from that in the first embodiment, which will be described in the second embodiment.

In step S1303, the control unit 502 checks whether the print job transmission request received in step S1301 from the cloud platform service 102 contains a work window account name. Processes (steps S1306 to S1308) when the received print job transmission request does not contain a work window account name (NO in step S1303) will be described in detail in the second embodiment.

If the print job transmission request received from the cloud platform service 102 contains a work window account name in step S1303 (YES in step S1303), the process advances to step S1304. In step S1304, the control unit 502 transmits a following request for the work window account name 902 to the cloud platform service 102.

In step S1305, the control unit 502 transmits, to the cloud platform service 102, a comment addition request for a print job save completion message corresponding to the message ID 903 of the work window account name 902. In step S1309, the control unit 502 transmits a timeline message acquisition request to the cloud platform service 102, and checks whether a comment has been added to the timeline. If no comment has been added (NO in step S1309), the process returns to step S1309 to repeat the processing.

If a comment has been added to the timeline in step S1309 (YES in step S1309), the control unit 502 confirms in step S1310 the message ID 903 for which the comment has been added. Then, the control unit 502 determines whether the message ID 903 is contained in records of the message information table 901. If no message ID coincides with the message IDs 903 contained in the records of the message information table 901 (NO in step S1310), the process returns to step S1309 to repeat the processing.

If a coincident message ID 903 is detected in the records of the message information table 901 (YES in step S1310), the control unit 502 checks whether the printing execution account name 904 of the record having the coincident message ID 903 matches the name of a user who wrote the comment (step S1311). If the printing execution account name 904 does not match the name of a user who wrote the comment (NO in step S1311), the process returns to step S1309 to repeat the processing.

If the printing execution account name 904 matches the name of a user who wrote the comment (YES in step S1311), the control unit 502 checks via the dictionary management unit 505 in step S1312 whether the comment contains a character string in the operation dictionary table 1001. For example, if the comment contains a character string stored in a printing start record 1002, the control unit 502 determines that the comment is a printing start instruction. If the comment contains a character string stored in a job cancel record 1003, the control unit 502 determines that the comment is a job cancel instruction. If the comment does not match the character string of any record ("not applicable" in step S1312), the control unit 502 determines that the command is not a print job operation instruction. The process returns to step S1309 to repeat the processing.

If the control unit 502 determines that the contents of the character string indicate a printing start instruction ("execution of printing" in step S1312), the control unit 502 transmits the print job entity 803 corresponding to a print job ID 905 to the image forming apparatus 104, and executes printing in step S1313. If the control unit 502 determines that the contents of the character string indicate a job cancel instruction ("cancel" in step S1312), the control unit 502 deletes the job in step S1317.

Upon receiving a printing result from the image forming apparatus 104 (YES in step S1314), the control unit 502 transmits, to the cloud platform service 102, a write request for a comment indicating the printing result in the message ID 903 (step S1315). In step S1316, the control unit 502 determines whether the printing result received from the image forming apparatus 104 indicates a normal end. If the printing result indicates a normal end (YES in step S1316), the process advances to step S1317. If the printing result indicates a printing error or the like other than a normal end (NO in step S1316), the process returns to step S1309 to repeat the processing.

In step S1317, the control unit 502 deletes the record containing the print job entity 803 from the job information table 801 via the job management unit 503. In step S1318, the control unit 502 determines via the message management unit 504 whether there is the work window account name 902 corresponding to the print job ID 905 of the record deleted in step S1317. If there is the work window account name 902 (YES in step S1318), the control unit 502 acquires, in step S1319 via the message management unit 504, the work window account name 902 corresponding to the print job ID 905 contained in the record deleted in step S1317. Further, the control unit 502 transmits a following release request for the work window account name 902 to the cloud platform service 102.

If there is no work window account name 902 (NO in step S1318), the control unit 502 releases following of the printing execution account in step S1320. This processing will be described in detail in the second embodiment.

In this manner, confirmation of the status of a print job and a print job operation are executed from the work window 601 in the cloud platform service 102 via the Web browser 105. In the embodiment, a printing start instruction and job cancel instruction are determined using the operation dictionary table 1001. In addition, a printing attribute such as the copy count, and an output printer name may be designated. When a processing error occurs, the print service 103 may post a comment indicating the error. Also, whew an error occurs, designation of an alternative image forming apparatus may be accepted in response to posting of a comment by the user.

In the embodiment, the print service 103 confirms account information of a user who has posted a comment concerning execution of a print job, and executes the print job based on the determination result. However, a user who has designated a print job and a user who has posted a message concerning execution of the print job may not always coincide with each other. For example, a user may assign a right to another user to execute a designated print job. In this case, the user as an assignee can execute the print job by posting a comment on the window.

The embodiment has exemplified a print job. However, the present invention is not limited to a print service, and is applicable to processing (job) which can be designated on various windows provided by the cloud platform service. In this case, the apparatus is not limited to a print service apparatus and functions as a service providing apparatus.

<Second Embodiment>

The first embodiment has described a method of confirming the status of a print job and performing a print job operation on the work window 601 by following a work window account (that is, work window). According to the method described in the first embodiment, even a third party who follows the work window account can confirm the status of the print job. When many print job operations are done, the message 603 of the work window 601 displays many messages (or comments) unnecessary for the third party who follows the work window account.

To prevent this, the second embodiment will explain a method in which a print service 103 follows a printing execution account (that is, user) not to display a message (or comment) unnecessary for a third party who follows a work window account. A description of the same contents as those in the first embodiment will not be repeated. In the second embodiment, a work window account name 705 of a custom button table 701 in FIG. 7A is not contained and its value is omitted. That is, in step S1301, information received from a cloud platform service 102 together with a print job is a printing execution account name 904 in the second embodiment.

In step S1303 of FIG. 10, a control unit 502 checks the contents of a print job transmission request received in step S1301 from the cloud platform service 102. If the print job transmission request does not contain a work window account name (NO in step S1303), the control unit 502 executes step S1306. In step S1306, the control unit 502 acquires the printing execution account name 904 via a message management unit 504 and transmits a following request for the printing execution account name 904 to the cloud platform service 102.

In step S1307, the control unit 502 transmits, to the cloud platform service 102, a request to add a message indicating the completion of saving the print job for the printing execution account name 904. In step S1308, the control unit 502 acquires, from the cloud platform service 102, a message ID 903 for uniquely identifying the message added in step S1307. The control unit 502 stores the message ID in the message ID 903 of a message information table 901 via the message management unit 504. The process then advances to step S1309. Processes in steps S1309 to S1317 are the same as those described in the first embodiment, and a description thereof will not be repeated.

In step S1318, the control unit 502 determines via the message management unit 504 whether there is a work window account name 902 corresponding to a print job ID 905 contained the record deleted in step S1317. As described above, the work window account name 902 is not contained in the second embodiment. If there is no work window account name 902 (NO in step S1318), the control unit 502 acquires, in step S1320 via the message management unit 504, the printing execution account name 904 corresponding to the print job ID 905 contained in the record deleted in step S1317. The control unit 502 transmits a following release request for the printing execution account name 904 to the cloud platform service 102.

As described above, in the printing system of the second embodiment, the print service 103 follows a printing execution account. Thus, confirmation of the status of a print job and a print job operation are performed without displaying a message unnecessary for a third party who follows a work window account.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-283731, filed Dec. 20, 2010, which is hereby incorporated by reference herein in its entirety.

What is claimed is:

1. A printing system comprising a client terminal having a Web browser, a Web service apparatus having a microblogging function, a print service apparatus, and an image forming apparatus, which are connected via a network,
said print service apparatus including:
a reception unit configured to receive, via the Web browser together with a print job designated from a window provided by said Web service apparatus, window information of the window, user information of a user who has designated the print job, and message information of a message which is contained in the window and provided by the microblogging function;
a management unit configured to manage the window information, the user information, the message information, and the print job in association with each other;
an addition unit configured to add, as a user using the microblogging function, a comment on the message corresponding to the message information to the window;
a monitoring unit configured to monitor whether another user has added a comment on the message corresponding to the message information to the window;
a determination unit configured to determine whether the added comment is a comment by the user corresponding to the user information; and
a decision unit configured to decide processing for the print job based on a content of the added comment when said determination unit determines that the added comment is a comment by the user corresponding to the user information.

2. The system according to claim 1, wherein
when said reception unit receives the print job, said monitoring unit starts monitoring using the window information,
upon completion of the processing decided by said decision unit for the print job, said addition unit adds, to the window using the microblogging function, a comment that the processing has ended, and
after said addition unit adds the comment that the processing has ended, said monitoring unit releases monitoring.

3. The system according to claim 1, wherein the comment is at least one of an instruction to execute the print job, cancellation of the print job, a change of a print setting, designation of an image forming apparatus which is to execute the print job, and assignment of a right to the print job.

4. The system according to claim 3, wherein
said print service apparatus further includes a transmission unit configured to transmit the print job to said image forming apparatus, and
when the comment is an instruction to execute the print job, said transmission unit transmits the print job to said image forming apparatus.

5. The system according to claim 1, wherein said decision unit decides processing for the print job using a table which defines in advance a correspondence between a character string and processing.

6. A printing system comprising a client terminal having a Web browser, a Web service apparatus having a microblogging function, a print service apparatus, and an image forming apparatus, which are connected via a network,
said print service apparatus including:
a reception unit configured to receive, via the Web browser together with a print job designated from a window provided by said Web service apparatus, user information of a user who has designated the print job;
a management unit configured to manage the user information and the print job in association with each other;
an addition unit configured to add a message as a user using the microblogging function to the window;
a monitoring unit configured to monitor whether another user has added a comment on the message to the window;
a determination unit configured to determine whether the added comment is a comment by the user corresponding to the user information; and
a decision unit configured to decide processing for the print job based on a content of the added comment when said determination unit determines that the added comment is a comment by the user corresponding to the user information.

7. The system according to claim 6, wherein
when said reception unit receives the print job, said monitoring unit starts monitoring using the window information,
upon completion of the processing decided by said decision unit for the print job, said addition unit adds, to the window using the microblogging function, a comment that the processing has ended, and after said addition unit adds the comment that the processing has ended, said monitoring unit releases monitoring.

8. A print service apparatus in a printing system including a client terminal having a Web browser, a Web service apparatus having a microblogging function, a print service apparatus, and an image forming apparatus, which are connected via a network, comprising:

a reception unit configured to receive, via the Web browser together with a print job designated from a window provided by the Web service apparatus, window information of the window, user information of a user who has designated the print job, and message information of a message which is contained in the window and provided by the microblogging function;

a management unit configured to manage the window information, the user information, the message information, and the print job in association with each other;

an addition unit configured to add, as a user using the microblogging function, a comment on the message corresponding to the message information to the window;

a monitoring unit configured to monitor whether another user has added a comment on the message corresponding to the message information to the window;

a determination unit configured to determine whether the added comment is a comment by the user corresponding to the user information; and a decision unit configured to decide processing for the print job based on a content of the added comment when said determination unit determines that the added comment is a comment by the user corresponding to the user information.

9. A print service apparatus in a printing system including a client terminal having a Web browser, a Web service apparatus having a microblogging function, a print service apparatus, and an image forming apparatus, which are connected via a network, comprising:

a reception unit configured to receive, via the Web browser together with a print job designated from a window provided by the Web service apparatus, user information of a user who has designated the print job;

a management unit configured to manage the user information and the print job in association with each other;

an addition unit configured to add a message as a user using the microblogging function to the window;

a monitoring unit configured to monitor whether another user has added a comment on the message to the window;

a determination unit configured to determine whether the added comment is a comment by the user corresponding to the user information; and a decision unit configured to decide processing for the print job based on a content of the added comment when said determination unit determines that the added comment is a comment by the user corresponding to the user information.

10. A print service apparatus in a printing system including a client terminal having a Web browser, a Web service apparatus having a microblogging function, a print service apparatus, and an image forming apparatus, which are connected via a network, comprising:

a reception unit configured to receive, via the Web browser together with a print job designated from a window provided by the Web service apparatus, user information of a user who has designated the print job;

a monitoring unit configured to monitors whether a message to the print job has been added to the window;

a determination unit configured to determines whether the added message is a message by the user corresponding to the user information; and a decision unit configured to decides processing for the print job based on a content of the added message when said determination unit determines that the added message is a message by the user corresponding to the user information.

11. A service providing apparatus in a system including a client terminal having a Web browser, a Web service apparatus having a microblogging function, and a service providing apparatus, which are connected via a network, comprising:

a reception unit configured to receive, via the Web browser together with a job designated from a window provided by the Web service apparatus, window information of the window, user information of a user who has designated the job, and message information of a message which is contained in the window and provided by the microblogging function;

a management unit configured to manage the window information, the user information, the message information, and the job in association with each other;

an addition unit configured to add, as a user using the microblogging function, a comment on the message corresponding to the message information to the window;

a monitoring unit configured to monitor whether another user has added a comment on the message corresponding to the message information to the window;

a determination unit configured to determine whether the added comment is a comment by the user corresponding to the user information; and a decision unit configured to decide processing for the job based on a content of the added comment when said determination unit determines that the added comment is a comment by the user corresponding to the user information.

12. A service providing apparatus in a system including a client terminal having a Web browser, a Web service apparatus having a microblogging function, and a service providing apparatus, which are connected via a network, comprising:

a reception unit configured to receive, via the Web browser together with a print job designated from a window provided by the Web service apparatus, user information of a user who has designated the job;

a management unit configured to manage the user information and the job in association with each other;

an addition unit configured to add a message as a user using the microblogging function to the window;

a monitoring unit configured to monitor whether another user has added a comment on the message to the window;

a determination unit configured to determine whether the added comment is a comment by the user corresponding to the user information; and a decision unit configured to decide processing for the job based on a content of the added comment when said determination unit determines that the added comment is a comment by the user corresponding to the user information.

13. A method of controlling a print service apparatus in a printing system including a client terminal having a Web browser, a Web service apparatus having a microblogging function, a print service apparatus, and an image forming apparatus, which are connected via a network, comprising:

a reception step of receiving, via the Web browser together with a print job designated from a window provided by the Web service apparatus, window information of the window, user information of a user who has designated the print job, and message information of a message which is contained in the window and provided by the microblogging function;

a management step of managing the window information, the user information, the message information, and the print job in association with each other;

an addition step of adding, as a user using the microblogging function, a comment on the message corresponding to the message information to the window;

a monitoring step of monitoring whether another user has added a comment on the message corresponding to the message information to the window;

a determination step of determining whether the added comment is a comment by the user corresponding to the user information; and a decision step of deciding processing for the print job based on a content of the added comment when the added comment is determined in the determination step to be a comment by the user corresponding to the user information.

14. A method of controlling a print service apparatus in a printing system including a client terminal having a Web browser, a Web service apparatus having a microblogging function, a print service apparatus, and an image forming apparatus, which are connected via a network, comprising:

a reception step of receiving, via the Web browser together with a print job designated from a window provided by the Web service apparatus, user information of a user who has designated the print job;

a management step of managing the user information and the print job in association with each other;

an addition step of adding a message as a user using the microblogging function to the window;

a monitoring step of monitoring whether another user has added a comment on the message to the window;

a determination step of determining whether the added comment is a comment by the user corresponding to the user information; and a decision step of deciding processing for the print job based on a content of the added comment when the added comment is determined in the determination step to be a comment by the user corresponding to the user information.

15. A non-transitory computer-readable medium storing a program for causing a computer to function as reception unit configured to receive, via a Web browser together with a print job designated from a window provided by a Web service apparatus, window information of the window, user information of a user who has designated the print job, and message information of a message which is contained in the window and provided by a microblogging function, management unit configured to manage the window information, the user information, the message information, and the print job in association with each other, addition unit configured to add, as a user using the microblogging function, a comment on the message corresponding to the message information to the window, monitoring unit configured to monitor whether a comment corresponding to the message information has been added to the window, determination unit configured to determine whether the added comment is a comment by the user corresponding to the user information, and decision unit configured to decide processing for the print job based on a content of the added comment when said determination unit determines that the added comment is a comment by the user corresponding to the user information.

16. A non-transitory computer-readable medium storing a program for causing a computer to function as reception unit configured to receive, via a Web browser together with a print job designated from a window provided by a Web service apparatus, user information of a user who has designated the print job, management unit configured to manage the user information and the print job in association with each other, addition unit configured to add a message as a user using the microblogging function to the window, monitoring unit configured to monitor whether another user has added a comment on the message to the window, determination unit configured to determine whether the added comment is a comment by the user corresponding to the user information, and decision unit configured to decide processing for the print job based on a content of the added comment when said determination unit determines that the added comment is a comment by the user corresponding to the user information.

* * * * *